(12) United States Patent
Ho et al.

(10) Patent No.: US 6,983,057 B1
(45) Date of Patent: Jan. 3, 2006

(54) METHODS FOR EMBEDDING IMAGE, AUDIO AND VIDEO WATERMARKS IN DIGITAL DATA

(75) Inventors: Anthony Tung Shuen Ho, Singapore (SG); Siu Chung Tam, Singapore (SG)

(73) Assignee: Datamark Technologies PTE Ltd., Singapore (SG)

( * ) Notice: Subject to any disclaimer, the term of this patent is extended or adjusted under 35 U.S.C. 154(b) by 0 days.

(21) Appl. No.: 09/701,809

(22) PCT Filed: Jun. 1, 1998

(86) PCT No.: PCT/SG98/00039

§ 371 (c)(1),
(2), (4) Date: Feb. 22, 2001

(87) PCT Pub. No.: WO99/63443

PCT Pub. Date: Dec. 9, 1999

(51) Int. Cl.
*G06K 9/00* (2006.01)

(52) U.S. Cl. ..................................... 382/100
(58) Field of Classification Search ............... 382/100, 382/232, 251, 248, 235, 215; 713/176; 380/54, 380/202, 250
See application file for complete search history.

(56) References Cited

U.S. PATENT DOCUMENTS 5,859,920 A * 1/1999 Daly et al. ................. 382/115

(Continued)

FOREIGN PATENT DOCUMENTS

EP 0766468 4/1997

(Continued)

OTHER PUBLICATIONS

Zhao, et al., "Embedding Robust Labels into Image for Copyright Protection," Proc. Of Int. Congress on IP Rights for Specialized Information, Knowledge and New Technologies, Vienna, Aug. 1995, pp. 1-10.*

(Continued)

*Primary Examiner*—Bhavesh M. Mehta
*Assistant Examiner*—Shefali Patel
(74) *Attorney, Agent, or Firm*—Baker Botts LLP

(57) ABSTRACT

A method for embedding an entire image, audio or video watermark sequence within another image, audio or video data sequence with minimum loss of data quality is presented. The method exploits the de-correlation property of data coefficients in the orthogonal transform domain, similar to the application in data compression through transform coding. The present invention describes the usage of a Discrete Cosine Transform as the embedding domain. However, other orthogonal transforms such as Fourier, Walsh-Hadamard, Haar, Sine and Wavelet can also be used for this operation. A unique key derived adaptively from spatial locations registering the thresholds of the ac transform energies is used to unlock or de-watermark the embedded image or audio sequence. Moreover, an exponential filter has been developed to compress and expand the watermark coefficients prior to the embedding and retrieval process. The method can be used in resolving multimedia copyright protection issues arising on the Internet and in the music industry, such as the inclusion of a company's logo or an artist's recorded voice. The method can also be incorporated as a built-in feature for digital recording devices, such as still and video cameras, as well as more recent devices such as VCD and DVD players. Moreover, the method can be applied to the commercial and service sectors, where security in transmission and reception of private information in terms of speech or image is of the utmost importance.

52 Claims, 10 Drawing Sheets

U.S. PATENT DOCUMENTS 6,359,998 B1 * 3/2002 Cooklev .................... 382/100
6,427,020 B1 * 7/2002 Rhoads .................... 382/100

FOREIGN PATENT DOCUMENTS

EP 0840513 5/1998
EP 0855681 7/1998

OTHER PUBLICATIONS

Ohnishi, et al., "Embedding a seal into a Picture under Orthogonal Wavelet Transform," IEEE, 1996, pp. 514-521.*

* cited by examiner

 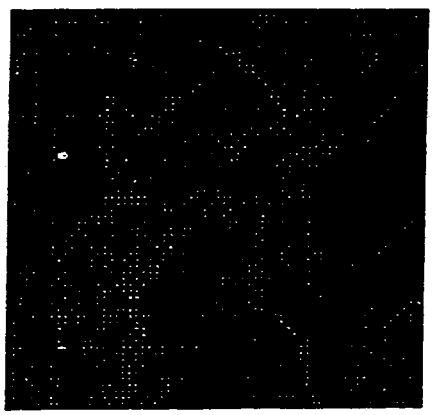
(a) (b)
FIGURE 3

*PSEUDOCODE*

PROCEDURE WATERMARK CODER

BEGIN
    READ UNLABELLED DATA;
    CONVERT UNLABELLED DATA TO MATRIX (M,N);
    PERFORM SUB-BLOCKING of UNLABELLED DATA;
    PERFORM DCT ON UNLABELLED DATA SUB-BLOCKS;
    RE-ORDER DCT COEFFICIENTS TO FOLLOW ZIG-ZAG PATTERN;
    DETERMINE AC ENERGIES OF DCT COEFFICIENTS;
    SET THRESHOLD BASED ON AC ENERGY MEAN AND STANDARD DEVIATION;
    COMPARE SUB-BLOCK AC ENERGIES WITH THRESHOLD;
    IF AC ENERGIES LESS THAN THRESHOLD THEN
        STORE SPATIAL LOCATIONS;
    ELSE
        SET TO OFFSET SPATIAL LOCATIONS;
    END
    GENERATE UNIQUE KEY FROM STRUCTURED/RANDOM SPATIAL LOCATIONS;
    STORE UNIQUE KEY FOR DECODING;

READ WATERMARK DATA;
    CONVERT WATERMARK DATA TO MATRIX (J,K);
    PERFORM SUB-BLOCKING of WATERMARK DATA;
    PERFORM DCT ON UNLABELLED DATA SUB-BLOCKS;
    RE-ORDER DCT COEFFICIENTS TO FOLLOW ZIG-ZAG PATTERN;
    RE-SCALE DCT COEFFICIENTS USING EXPONENTIAL FILTER;

EMBED RE-SCALED WATERMARK DCT COEFFICIENTS INTO UNLABELLED DCT SUB-BLOCKS;
    CONVERT ZIG-ZAG SCAN BACK TO NORMAL SCAN;
    INVERSE DCT SUB-BLOCKS TO OBTAIN LABELED DATA;
END

FIGURE 8a

*PSEUDOCODE*

PROCEDURE WATERMARK DECODER

BEGIN
    READ LABELED DATA;
    CONVERT LABELED DATA TO MATRIX (M,N);
    PERFORM SUB-BLOCKING of LABELED DATA;
    PERFORM DCT ON LABELED DATA SUB-BLOCKS;
    RE-ORDER DCT COEFFICIENTS TO FOLLOW ZIG-ZAG PATTERN;

EXTRACT SPATIAL LOCATIONS FROM UNIQUE KEY;
    DECODE WATERMARK DCT COEFFICIENTS FROM SPATIAL LOCATIONS;
    SCALE WATERMARK DCT COEFFICIENTS USING INVERSE EXPONENTIAL FILTER;
    CONVERT ZIG-ZAG SCAN BACK TO NORMAL SCAN;
    INVERSE DCT SUB-BLOCKS TO OBTAIN WATERMARK DATA;
END

FIGURE 8b

(a)
(b)
(a)
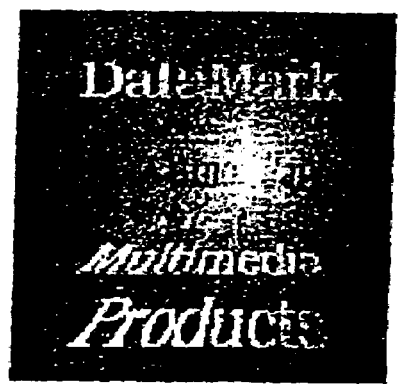
(b)
FIGURE 9

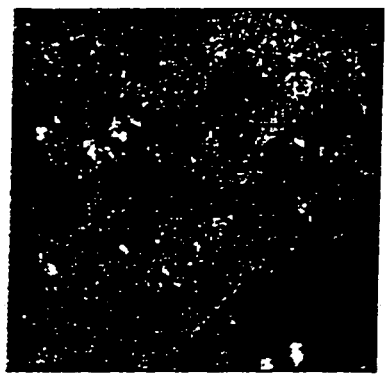
(a)
(b)
(a)
(b)
FIGURE 10

METHODS FOR EMBEDDING IMAGE, AUDIO AND VIDEO WATERMARKS IN DIGITAL DATA

FIELD OF THE INVENTION

This invention relates generally to the digital communications and multimedia fields and in particular the invention provides a method for the embedding and retrieval of digital image, audio or video watermarks in the transform domain for digital multimedia data, with applications in copyright protection and security data transmission and reception.

BACKGROUND OF THE INVENTION

The tremendous growth in multimedia products and services through the Internet has led to the need for copyright protection, authentication and integrity of data. In the past few years, a number of digital watermarking techniques have been developed and patents granted, for the purpose of resolving the legal use or misuse of copyright information on the Internet. Unlike data encryption that transforms the original data to another form for security transmission, digital watermarking embeds an invisible or inaudible watermark directly into the original data.

Typical examples of recent work in the field of digital watermarking or data embedding are described in U.S. Pat. No. 5,636,292 to Rhoads (1997) and U.S. Pat. No. 5,659,726 to Sandford and Handel (1997). Rhoads discloses methods for embedding an identification code on a carrier signal, such as an electronic data signal or a physical medium. Sandford and Handel disclose a method of embedding auxiliary information into a set of host data, such as a photograph, or a television signal.

Prior art publications in the field of digital watermarking technology, including the two aforementioned granted U.S. Patents, generally envisage only the embedding of a very limited number of bits of information (in the form of binary digits '1' and '0') or a few characters (such as 'A12') into the carrier signal. More detailed ownership information requires a higher level of embedded watermark information either in the form of longer alphanumeric character strings or, if possible, trademarks/logo images, or speech of the original owner, which is embedded into and retrieved from the carrier signal. However, this has previously been considered to be very difficult to achieve, without significant corruption of the data being labelled as the amount of data to be inserted is increased. The present invention describes such a method for embedding digital audio or image watermarks directly into targeted audio or image data, substantially inaudibly or invisibly, respectively.

There are many other potential consumer, commercial and service applications that can benefit from the use of digital watermarking technology in copyright protection and security transmission. These applications include the embedding of owner identification, such as the trademarks or logos of an owner into digital still and video cameras, or copyright protection and royalty tracking monitoring of sound recordings in the music industry with digital audio watermarks of the artists' voice embedded into the sound tracks.

Furthermore, commercial and service sectors are also interested in the secure transmission and reception of sensitive messages, data, and even images that could be camouflaged into normal data streams transmitted over an open channel.

SUMMARY OF THE INVENTION

In this specification and claims the term "unlabelled data" is to be given the meaning of target data to which a new label is to be added by the method of the present invention, whether or not that target data is carrying a previously applied label. Similarly the term "labelled data" is to be given the meaning of target data to which the new label has been added by the method of the present invention.

According to a first aspect, the present invention provides a method for applying digital watermarking image data or digital watermarking audio data to an unlabelled digital image, audio, or video data sample, said method including the steps of:

a) inputting a set of unlabelled digital data and a set of digital watermark data;

b) formatting the unlabelled digital data into a format suitable for orthogonal transformation;

c) performing an orthogonal transformation on the formatted unlabelled data to produce a set of unlabelled data transform coefficients;

d) formatting the digital watermark data into a format suitable for orthogonal transformation;

e) performing an orthogonal transformation on the formatted watermark data to produce a set of watermark data transform coefficients;

f) for each watermark data transform coefficient, allocating an unlabelled data transform coefficient to be replaced and replacing the respective unlabelled data transform coefficients to produce a labelled set of data transform coefficients;

g) storing the locations into which watermark data transform coefficients were encoded in the set of labelled data transform coefficients to generate a unique key for future decoding of the watermark data;

h) performing an inverse orthogonal transformation on the labelled data transform coefficients to convert them into a set of labelled digital data having a form resembling the original unlabelled digital data.

Preferably, the steps of formatting the unlabelled and watermarked data include the steps of mapping the set of unlabelled data and the set of watermark data into two-dimensional matrices prior to performing the orthogonal transformations.

Preferably also the matrices of unlabelled and watermark data are divided into smaller sub-blocks prior to orthogonal transformation.

The preferred method further includes the step of ordering the orthogonal transformation coefficients in each sub-block of the watermark data into one-dimensional arrays in approximately increasing frequency order (throughout the specification and claims, the term "approximately increasing frequency order" is used in respect of one-dimensional arrays of orthogonal transform coefficients to indicate that the coefficients of the array are ordered in generally increasing frequency order, from the first to the last position in the array, with only occasional localised deviations from the generally increasing trend) by performing a zig-zag scan of each sub-block of orthogonally transformed watermark data The reordered orthogonal transformation coefficients are then divided into segments for subsequent replacement into the set of transformation coefficients of the unlabelled data.

The preferred method further includes the step of ordering the orthogonal transformation coefficients of the unlabelled data into one-dimensional arrays in approximately increasing frequency order by performing a zig-zag scan of each sub-block of orthogonally transformed unlabelled data prior to replacement of the watermark data coefficients and performing an inverse zig-zag scan on the labelled data coefficients prior to the inverse orthogonal transformation. In the step of allocating a segment of the orthogonally-transformed watermark data that will be encoded in each sub-block of the unlabelled data, the allocation may be performed in a structured or random manner.

Alternatively, the zig-zag and inverse zig-zag scans of each data type can be replaced with a radial and inverse radial scans respectively.

It is also preferable to calculate the mean and variance of the ac energies from the orthogonal transformation coefficients for each sub-block of the unlabelled data in order to allocate the locations of the transform coefficients of the unlabelled data which will be replaced by the transform coefficients of the segment of watermark data. Preferably the transform coefficients to be replaced in the transformed unlabelled data will be those in which the ac energies fall below a predetermined threshold value.

The transform coefficients of the watermark data embedded in the labelled digital data are also preferably compressed prior to embedding, using a scaling function. Preferably the compression function has an exponential characteristic, however in other embodiments scaling functions having another characteristic similar to an exponential function may be used to similar effect.

According to a second aspect, the present invention provides a method for extracting digital watermarking image data or digital watermarking audio data from a digital image, audio, or video data sample, said method including the steps of:

a) inputting a set of labelled digital data and unique key data containing information of locations of watermark data imposed as a label on the labelled digital data;

b) mapping the set of labelled digital data into a format suitable for orthogonal transformation;

c) performing an orthogonal transformation on the formatted labelled data to produce a set of labelled data transform coefficients;

d) using the unique key to extract a segment of transform coefficients of orthogonally transformed watermark data from the locations in the set of labelled data transform coefficients specified in the key;

e) using an inverse orthogonal transformation on the transformed watermark data to retrieve the embedded watermark data.

Preferably, the formatting step of the watermark extraction method includes the step of mapping the set of labelled data into a two-dimensional matrix prior to performing the orthogonal transform.

Preferably also, prior to orthogonal transformation, the matrix of labelled data is divided into the same number of smaller sub-blocks as that used in the encoding process.

It is also preferable to order the orthogonal transformation coefficients of the labelled data in each sub-block into a one-dimensional array in approximately increasing frequency order by performing a zig-zag scan of each sub-block of orthogonally transformed labelled data prior to extraction of the watermark data coefficients and performing an inverse zig-zag scan on the extracted watermark data coefficients to build a matrix of sub-blocks of watermark data prior to the inverse orthogonal transformation. In some embodiments of the invention a radial scan is used in the encoding process of the unlabelled data to order the unlabelled data prior to replacement with watermark data in which case a radial scan and inverse radial scan should also be used in the decoding process instead of respectively a zig-zag scan and inverse zig-zag scan.

The transform coefficients of the watermark data embedded in the labelled digital data are also preferably compressed prior to embedding and the extraction method includes the step of expanding the compressed watermark data prior to the inverse orthogonal transformation, the compression and expansion steps using scaling functions each having a characteristic which is the inverse of the other. Preferably the compression function has an exponential characteristic and the expansion function has an inverse exponential characteristic. In other embodiments scaling functions having characteristics similar to an exponential and inverse exponential function respectively may be used to similar effect.

In embodiments of the invention, the retrieved watermark data samples may either be displayed as a visual or audio output of the encoding process for immediate examination or authentication, or may be stored as a digital file for future visual or aural examination or authentication or for digital comparison with a master reference file.

Preferably, the orthogonal transform is a Discrete Cosine Transform (DCT) and the inverse transform is an inverse DCT, however, other orthogonal transforms such as Fourier, Walsh-Hadamard, Haar, Sine, and Wavelet transforms can also be used.

The unlabelled digital data samples may be obtained from a sample stream representing a digitised grayscale or colour image, for example, as provided by a digital still camera. Alternatively, the unlabelled digital data may be obtained from a sample stream representing digitised video in which case the source may be a video camera or a master tape of video program material.

In the second aspect of the invention, the labelled data prior to decoding, will in most cases be obtained from some form of recording such as a recording on a Video CD (VCD), a Laser Disc (LD) or a Digital Versatile Disc (DVD) carrying a recording of the labelled data as the digitised video in a digitised movie or still image contained within a video game or other software. The labelled data may also be obtained from a broadcast transmission.

The unlabelled and labelled digital data may also be a part of an audio signal in which case it may be a digitised sample stream representing digitised sound or music and may include two sample streams representing channel A and channel B of digitised stereo sound, each of which or either will be encoded with watermark data.

In the case of audio data, the transmission step might involve recording the labelled data on a Compact Disc (CD), Digital Audio Tape (DAT), a Laser Disc (LD), a Video CD (VCD), live digital broadcast, or live digital music or conversation down a communication channel such as a telephone line or phone through internet.

The labelled digital data may also be a part of an image or a video signal that contains a digitised audio segment as watermark data. In this case, the transmission step might involve recording the labelled data on a video CD, a digital versatile disc (DVD), a laser disk or live transmission of images or video signals down a communication channel such as a telephone line or through the internet.

Preferably, the watermark digital data will include one or more of: an owner's logo, an owner's trademark, a personal identification, an artist's recorded voice or, general terms for publisher distribution.

Embodiments of the present invention provide a digital watermarking method that embeds and retrieves either digital audio or image watermarks in the temporal (one-dimensional) and spatial (two-dimensional) domain of digital data. Compared with existing methods, which target mainly the embedding of alphanumeric character codes as watermarks, embodiments of the present invention have the distinct advantage of embedding and retrieving an entire audio or image watermark into various digital data formats, inaudibly or invisibly, respectively.

Digital watermarking methods according to the preferred embodiment of the invention are truly generic in the sense that they can be applied to many different formats of digital media. The method operates on orthogonal transform coefficients of the data source. The advantages of using orthogonal transforms in the field of digital image processing such as data compression, restoration, enhancement and pattern recognition have been well documented in the literature. The main advantage of using orthogonal transforms instead of a temporal or spatial domain is the de-correlation processes that result in fewer coefficients with significant energies of interest. Subsequently, a number of data processing techniques such as filtering and thresholding can be directly applied to the transform coefficients.

Using embodiments of the present invention, a digital image of a trademark or logo can be embedded into and retrieved from a grayscale or colour image stored in either BMP, GIF, TIFF, JPEG or MPEG format. In audio watermarking, the same method can be used to embed a signature audio sequence into typical audio formats such as WAV and AIFF or into images or video signals. This method can also be extended to embedding audio watermarks in digital image or video data, such as DVD and VCD formats, or live signals through the internet or down a telephone line.

Correlation studies performed on many experimental tests of the present invention have revealed that the labelled (embedded or watermarked) data and the original unlabelled data can result in high correlation coefficient value in the range of approximately 0.91 to 0.99 (When there are absolutely no differences between two images, the correlation value would equal to 1.). The present method exploits the de-correlation property of coefficients in the transform domain for watermark embedding. In the transform domain, most of transform coefficient energies are associated with only a few low frequency coefficients thus the watermark data can be embedded in the high frequency region.

With the tremendous growth in products and services provided through the Internet, the need for copyright protection, authentication and integrity of digital data is rapidly increasing in importance. With the present method, a company's logo or trademark can be embedded entirely into a digital image invisibly or into a sound track inaudibly. The hidden data or watermark can then be subsequently used in resolving copyright protection issues.

Consumer products, such as digital still and video cameras, can also exploit the benefits of this invention as a built-in feature of their integrated technology, for example in copyright protection and product identification. Digital watermarking can also be very useful in commercial and personal communications. For example, classified or sensitive information can be embedded within an audio, digital still/video data for secure transmission and reception.

Preferably, embodiments of the invention provide the same generic functional capability of a digital watermarking method whether the digital audio, or image watermark is embedded into any one of various data formats, such as grayscale and colour images, or audio or video data.

According to a third aspect, the present invention provides apparatus for applying digital watermarking image data or digital watermarking audio data to an unlabelled digital image, audio, or video data sample, said apparatus including:

a) input means arranged to input a set of unlabelled digital data;

b) processing means arranged to process the unlabelled digital data to encode watermark data into the unlabelled data to form a set of labelled digital data; and c) output means arranged to output the labelled digital data to a communication or storage medium, wherein the processing means is arranged to perform the method as herein described.

According to a fourth aspect, the present invention provides an apparatus for extracting digital watermarking image data or digital watermarking audio data from labelled digital image, audio, or video data sample said apparatus including:

a) input means arranged to input a set of labelled digital data;

b) processing means arranged to process the labelled digital data to extract watermark data encoded into the labelled digital data; and c) output means arranged to output the extracted watermark digital data to a display or storage means, wherein the processing means is arranged to perform the method as herein described.

According to a fifth aspect, the present invention provides a digital recording, recorded on any recording medium, the recording being encoded with watermark data in accordance with the methods described.

BRIEF DESCRIPTION OF THE DRAWINGS

Embodiments of the invention will now be described, by way of example, with reference to the accompanying drawings in which:

FIG. 3 illustrates an image a) before and b) after a step of performing a Discrete Cosine Transform (DCT) on the sub-blocks of the image used in an embodiment of the invention;

FIG. 8 illustrates a pseudocode listing of the embodiment of FIG. 7 providing a digital watermarking system that can apply to audio, image or video data.

FIG. 9 illustrates an example of digital image watermarking of a company's logo, of size 128×128, into a real image, of size 512×512, of a woman's face, created using an embodiment of the present invention;

FIG. 10 illustrates another example of digital image watermarking of a company's logo, of size 128×128, into a real image, of size 512×512, of a satellite image, created using an embodiment of the present invention;

DETAILED DESCRIPTION OF EMBODIMENTS OF THE INVENTION

Embodiments of a digital watermarking method will now be described in which the coefficients of a Discrete Cosine Transform (DCT) are employed. However, implementations of the invention are not limited solely to the use of DCT, and other orthogonal transforms such as discrete Fourier, Walsh-Hadamard, Haar, Sine and Wavelet transforms can also be used to good effect. In the preferred embodiment, both unlabelled data and watermark image data are first converted into two-dimensional matrices and then divided into sub-blocks, prior to orthogonal transformation. The present invention requires that the dimension size of the unlabelled data set must be at least twice the dimension size of the watermark data in each dimension, to fulfil a requirement that is closely related to the concept of the Shannon's sampling theorem. For example, for a 512×512 unlabelled image, the watermark image should be typically 256×256 or smaller.

Figure 1:
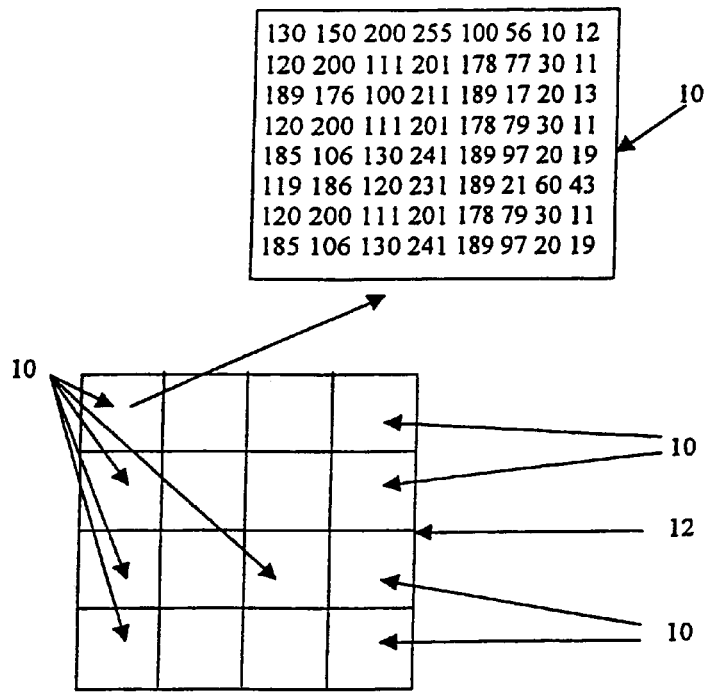
FIG. 1 illustrates a step of sub-blocking a matrix for orthogonal transformation used in embodiments of the invention.

Preferably each sub-block of the matrices is 8×8 pixels, which is typically considered to be a good size for data compression applications in terms of speed and minimum blocking edge effects, introduced by the sub-blocking process. For example, 8×8 and 16×16 are commonly used in JPEG and MPEG formats, however other sub-block dimensions may also usefully be employed. After sub-blocking, the individual sub-block data are then mapped into the transform domain through a DCT operation. The respective transform coefficients are then operated on by a number of processing steps necessary for digital watermarking. FIG. 1 illustrates the 8×8 sub-blocking blocking process in which a matrix 12 is divided into a plurality of 8×8 sub-blocks 10 for orthogonal transformation.

Figure 2:
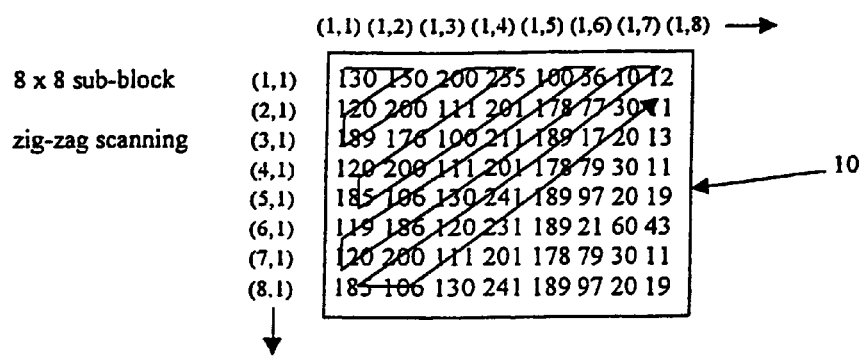
FIG. 2 illustrates a zig-zag scanning technique used in an embodiment of the invention, as compared to conventional line-by-line or raster scanning.

Referring to FIG. 2, the first processing step in the transform domain is to rearrange the transform coefficients of the unlabelled and watermark data by performing a zig-zag scan of each sub-block. The zig-zag scanning technique has been used extensively in data compression. This technique essentially re-orders the transform coefficients from low frequency to high frequency in an approximately ascending manner. For example, for a two-dimensional sub-block of size, M×N, the dc transform coefficient or zero frequency component, is located at (1,1), and the other ac transform coefficients are at the following locations, (1,2), (1,3), . . . , (1,N), . . . , (2,1), (2,2), (2,3), . . . , (2,N), . . . , (M,1), (M,2), (M,3), . . . , (M,N). The zig-zag scanning technique will re-order the coefficient locations as follows: (1,1), (1,2), (2,1), (3,1), (2,2), (1,3), (1,4), . . . , (M,N). In this manner, for each sub-block, the elements in the (M×N) matrix will be mapped into a one-dimensional array of size MN. FIG. 2 illustrates the zig-zag scanning technique applied to the first 8×8 sub-block 10 of FIG. 1.

After zig-zag scanning, the transform coefficients are subjected to statistical analysis. In this operation, the ac transform energies of the unlabelled data are first calculated from the transform coefficients and then compared with a threshold value derived from the mean and standard deviation of the ac transform energies. The use of an adaptive energy threshold allows optimum offset positions in each one-dimensional array to be determined. The offset position in each one-dimensional array corresponds closely with the minimum ac energies within that array. Beyond this position, the transform coefficients do not play a vital role even if they are neglected. This is similar to conventional transform coding where data compression is achieved by coding only those transform coefficients with sufficient energies, which generally fall into the low frequency range. FIG. 3 illustrates the DCT domain of sub-blocks of an image.

It should be noted that the statistical method described in this embodiment is not the only possible method that can be used to set the location for replacement of the watermark data. Other adaptive filtering techniques include the choice of a fixed location for each watermark block, or alternatively the flexible use of statistical data such as the mean, standard deviation, and higher-order moments.

The embedding process of watermark coefficients must avoid overwriting any relevant transform coefficients of the unlabelled data with significant ac energies, as this would introduce unnecessary errors in the unlabelled data. Locating the optimum locations is therefore not only important in reducing the errors but the locations also generate a unique key that will be used later for decoding. Through the process of embedding the unlabelled data with an invisible or inaudible watermark, the combined data set will now become labelled data. Integrity of the labelled data depends entirely on how the ac transform coefficients of the unlabelled data are overwritten or replaced by the watermark transform coefficients, during the embedding process.

The watermark data is also grouped into a two-dimensional matrix. The data is then divided into sub-blocks. Each sub-block is subjected to DCT or other orthogonal transformation in the same way as the unlabelled data has been treated. Again, zig-zag scanning is applied to arrange the transformation coefficients in an approximately increasing frequency order. The transformation coefficients for the watermark data are then blocked into segments for structured or random embedding in the transformation coefficients of the unlabelled data. Each segment of transformation coefficients to be embedded may be subjected to an optional scaling operation. This will help to minimise the overall effect of the transformation coefficients on the unlabelled data. In one preferred embodiment, the scaling function is an exponential function, although other similar mathematical functions may also be used.

Figure 4:
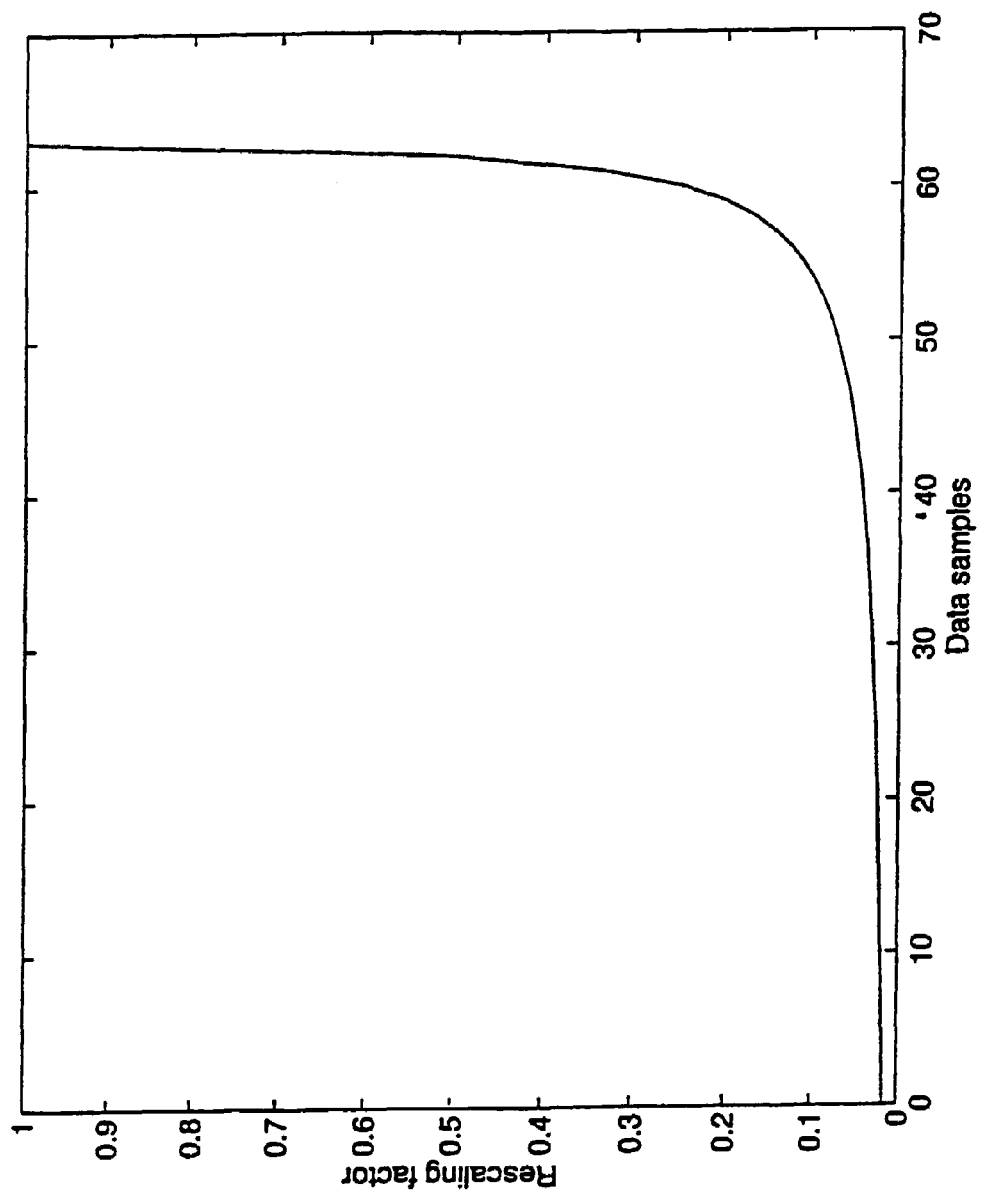
FIG. 4 illustrates an exponential curve used in a step of re-scaling the transform coefficients used in embodiments of the invention.

FIG. 4 illustrates the adaptive filtering for re-scaling of transform coefficients that follows an exponential curve. An inverse curve to the exponential curve of FIG. 4 will be used in the decoding process. Other scaling techniques such as the reciprocal function, normal, log-normal, hyper-exponential, or other appropriate probability density functions can also be used.

Figure 5:
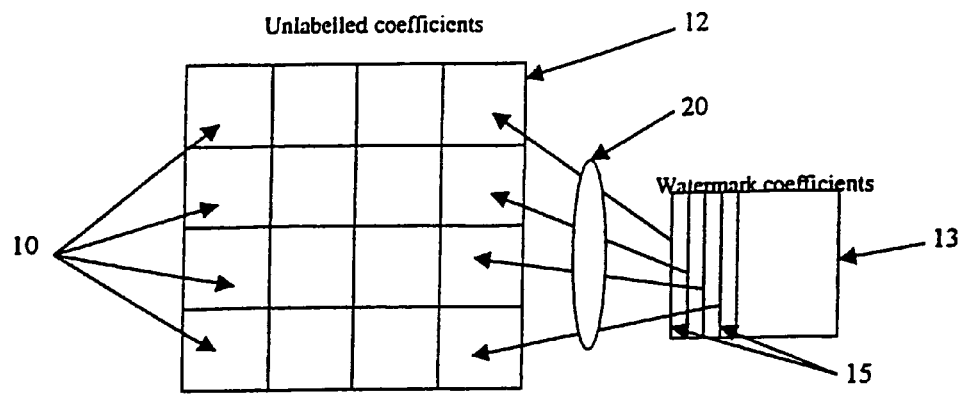
FIG. 5 illustrates a step of embedding the watermark coefficients in a structured manner in accordance with an embodiment of the invention.
Figure 6:
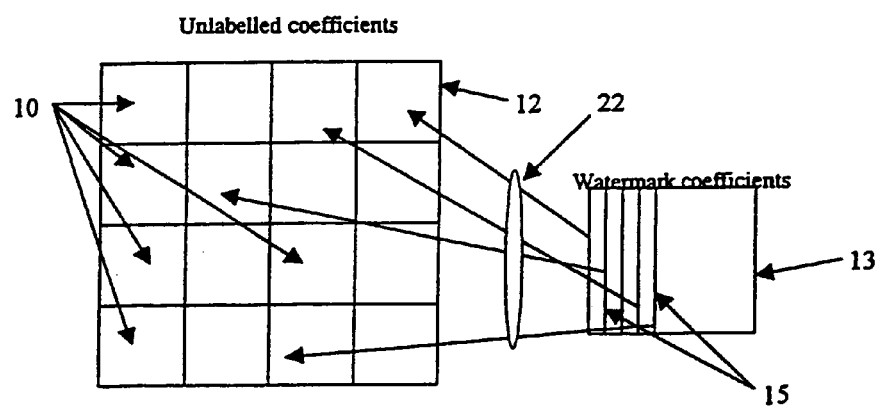
FIG. 6 illustrates a step of embedding the watermark coefficients in a random manner in accordance with another embodiment of the invention.

As the dimensional size of the unlabelled data 12 is at least twice the dimensional size of the watermark data 13, the embedding or encoding process of watermark coefficients 15 can exploit the additional sub-blocks 10 available in the unlabelled data 12. The encoding process can be performed either in a structured or random manner. For example, in a structured manner, the watermark coefficients 15 can be embedded in every odd or even column or row of the unlabelled transform coefficient locations. While in a random manner, the watermark coefficients can be located in different columns or rows, depending on a specified random sequence. FIGS. 5 and 6 illustrate the watermark coefficients 15 embedded in a structured 20 and random 22 manner, respectively.

One important feature of the present invention is that the sizes of both unlabelled and labelled data are compatible. For example, a 512×512 grayscale image, embedded with a 128×128 watermark grayscale image corresponds to exactly the same data size of the unlabelled image, approximately 262 kBytes. A unique key for the labelled image is generated and the size of the key is much less than the watermark grayscale image of size of 16.4 kBytes of data. The size of the key for a 512×512 image is only approximately 4 kBytes.

The unique key and the labelled data generated will be transmitted to the decoder for extraction of the digital watermark. For added security, the unique key can be further encrypted through some random sequence. From the unique key, the spatial locations of the embedded watermark transform coefficients are extracted for each sub-block. The extracted transform coefficients are then expanded through the application of an inverse optional exponential or other appropriate compression curve. These expanded coefficients are subsequently converted back to follow a normal scanning pattern in a two-dimensional matrix before being operated on by an inverse DCT.

Figure 7:
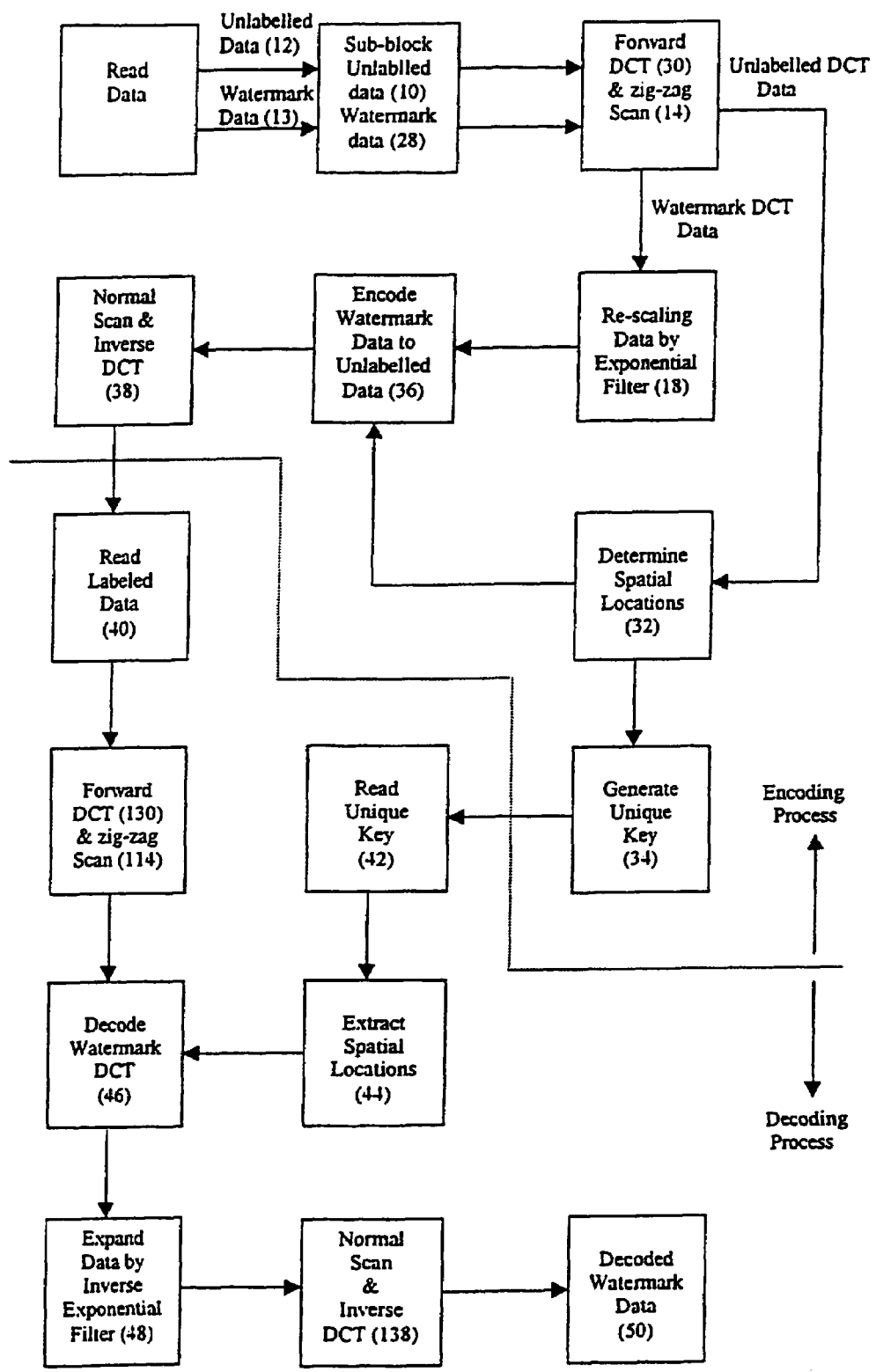
FIG. 7 illustrates a schematic block diagram of an embodiment of the present invention for embedding and retrieval of digital watermarks through orthogonal transformation.

FIG. 7 illustrates a schematic process flow diagram of the present invention for embedding and retrieval of digital watermarks through orthogonal transformation. Referring to FIG. 7, the unlabelled raw data 12 and the watermark raw data 13 are first divided into sub-blocks 10, 28. Both data sub-blocks are individually transformed through a DCT 30. The transform coefficients of the sub-blocks are then re-ordered to follow a zig-zag pattern 14. Spatial locations for embedding are derived from the ac transform energies 32 of the unlabelled data 12. A unique key 34 for decoding is generated from these spatial locations. Prior to embedding the watermark coefficients onto the unlabelled spatial locations, the watermark coefficients are first compressed by an exponential filter 18. The compressed watermark coefficients are embedded 36 structurally or randomly into the unlabelled sub-block DCT coefficients. The labelled coefficients are then re-ordered from a zig-zag scan pattern back to a normal scan pattern, before an inverse DCT transformation 38 is performed on the coefficients to obtain the labelled data 39.

At the decoding end, the labelled data 38 and the unique key 34 are both read 40. The same process of forward DCT transformation 130 and zig-zag scanning 114 are also performed on the labelled data, as in the case during the embedding stage. From the labelled transform coefficients, the watermark coefficients are decoded 46 from the labelled coefficients based on the spatial locations extracted 44 from the unique key. The watermark coefficients are expanded through an inverse exponential filter 48 and re-arranged to follow a normal scan pattern. This is then followed by an inverse transformation by DCT 138 to obtain the decoded watermark data.

FIGS. 8a and 8b illustrate pseudocode listings of a digital watermarking coder and decoder system that can be applied to image, audio and video data. FIGS. 9 and 10 illustrate examples of digital image watermarking in the form of a company logo of size 128×128 into two real images of size 512×512 of a women's face and a satellite image, respectively. Correlation analysis performed on these examples between the unlabelled and labelled images and original and decoded watermarks have yielded correlation coefficients of 0.9932 and 0.9975 for the face and watermark, respectively. While for the satellite image and its logo, the correlation coefficients for unlabelled and labelled images and original and decoded watermarks are 0.9979 and 0.9994, respectively.

The proposed method of digital watermarking of an audio sequence inaudibly or image sequence invisibly into digital data has many potential applications for resolving copyright protection issues in the consumer sector or for security transmission in the commercial and service sectors. This principle applies to personal voice communication through open-channel communication systems. For example, data watermarking of a company's logo/trademark or a person's identification can be incorporated into consumer electronic products, such as digital still/video camera and more recently, VCD and DVD players, to authenticate the true ownership of intellectual property right and consumer identification. Another major consumer area for digital watermarking is in the protection of illegal copying and downloading of music CDs and tapes. For example, the voice of the artist can be inaudibly embedded into a sound track through the use of the present invention.

In the commercial sector, the copyright protection of multimedia data on the Internet needs also to be monitored closely, as there are tremendous amount of original data in the form of music, image and video, illegally downloaded and redistributed without the consent of the true owners. The present invention can be used to address this problem, as well as providing the security transmission of embedded data in some commercial banking operations. Similarly in the service sector, sensitive audio or image data can be embedded into an ordinary speech or image for secure transmission, respectively.

Figure 11:
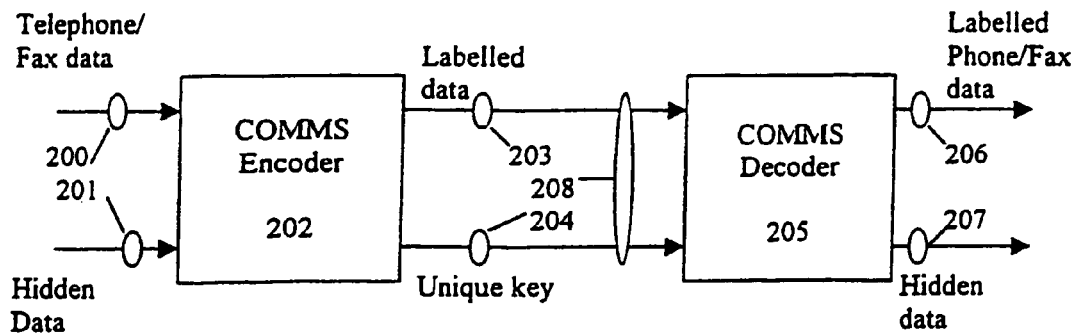
FIG. 11 illustrates a block diagram of a communications encoder/decoder for hidden data encoded on a communications channel.

Referring to FIG. 11, an application of the method of the present invention is illustrated, in which input digital facsimile or telephone audio data 200, is encoded with hidden digital data 201 in a communication encoder 202 embodying an encoding method according to the invention.

The encoder 202 outputs a set of labelled digital facsimile or telephone data 203 and a unique key 204 as a result of the encoding process and these are transmitted via a communications channel 208 to a communication decoder 205 embodying a decoding method according to the invention. The decoder outputs labelled (i.e. unaltered) digital facsimile or telephone data 206 and extracted hidden data 207 which may represent a hidden message, or may be used to validate the source of the telephone facsimile data.

Figure 12:
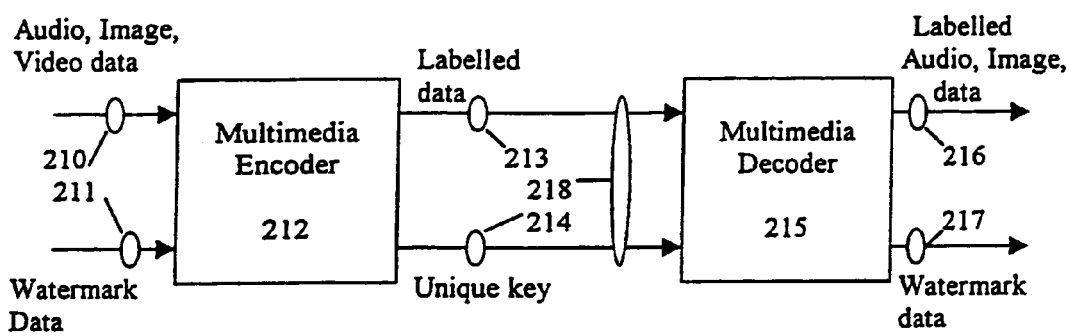
FIG. 12 illustrates a block diagram of a multimedia encoder/decoder for watermark data.

Turning to the embodiment of FIG. 12, a further application of the method of the present invention is illustrated, in which input digital audio, image or video data 210 is encoded with digital watermark data 211 in a multimedia encoder 212 embodying an encoding method according to the invention. The encoder 212 outputs a set of labelled digital audio, video or image data 213 and unique key data 214 as a result of the encoding process and is carried as a recording on any suitable digital recording media or as a transmission over a communications or broadcast channel 218. In turn, the labelled data 213 and key data 214 are fed to a multimedia decoder 215 which extracts the watermark data and outputs the watermark data 217 and the labelled data 216. The extracted label or watermark 217 may be displayed to indicate the origin or ownership of the recording or transmission to the user of the data.

Figure 13:
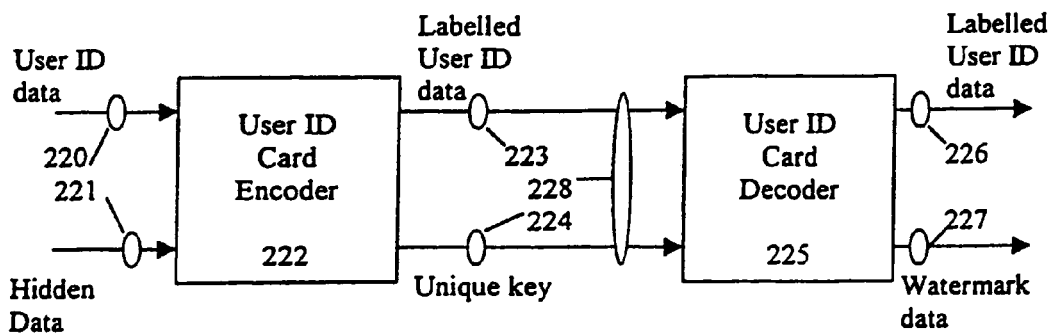
FIG. 13 illustrates a block diagram of a personal identification card encoder/decoder.

In FIG. 13, yet another application of the invention is illustrated in which identification information 220 such as personal identification information from an identification (ID) card is encoded with watermark data 221 in an identification (ID) card encoder 222 such that output labelled ID data 223 may be validated at a later date. The ID card encoder 222 outputs labelled ID data 223 and a unique key 224 produced by the encoding process for transmission 228 as part of a transaction such as a credit card transaction which requires secure transmission of the card holder's identity.

A card decoder 225 which receives the transmission 228 includes a watermark decoder according to the present invention which inputs the transmitted labelled ID data 228 and the unique key 224 and outputs ID data 226 and watermark data 227. The watermark data 227 may then be used to indicate validity or otherwise of the labelled ID data 226 in an authentication process associated with the transaction.

The proposed method of data watermarking can embed audio or image data, inaudibly or invisibly, respectively, into various digital multimedia data formats, such as audio, image and video. Provided the unlabelled data dimension size is at least twice the dimension size of the watermark data, an artist's recorded voice or an entire image of a company's logo or trademark, for example, can be embedded into audio and image and video data, without any serious degradation to the data quality. The proposed method exploits the de-correlation property of orthogonal transforms for embedding and retrieving digital watermarks.

Although the proposed method describes mainly the use of a discrete cosine transform as the domain for watermarking; however, orthogonal transforms such as Fourier, Walsh-Hadamard, Haar, Sine and Wavelet can also be applied. Instead of the current watermarking technology of embedding text strings into digital data, the proposed method would provide additional complementary proof as to the true ownership of the digital data, by the use of a company's logo or a recording of the artist's voice, making a copyright infringement claim easier to substantiate than when just a text string is applied as the watermark.

The ability of the proposed method to embed and retrieve an entire audio or image watermark is a significant advantage over current prior art techniques that could only embed very simple and limited number of bits or characters into the data. Correlation performed on digital data before and after digital watermarking using the proposed method has shown the data to be very close to one, indicating that there is minimum loss in data integrity. A significant advantage of the preferred embodiment is that the labelled and unlabelled data have the same data size. A unique key generated during the embedding process that is necessary for decoding the watermark is only fractional of the watermark data size.

Digital still and video cameras can also benefit from the proposed method as a built-in feature of their integrated technology. Moreover, digital watermarking can be useful in commercial and personal communications. For example, a classified audio or image can be embedded into digital multimedia data for secure transmission.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method for applying digital watermarking image data or digital watermarking audio data to an unlabeled digital image, audio, or video data sample, said method including the steps of:
    a) inputting a set of unlabeled digital data and a set of digital watermark data;
    b) formatting the unlabeled digital data into a format suitable for orthogonal transformation;
    c) performing an orthogonal transformation on the formatted unlabeled data to produce a set of unlabeled data transform coefficients;
    d) formatting the digital watermark data into a format suitable for orthogonal transformation;
    e) performing an orthogonal transformation on the formatted watermark data to produce a set of watermark data transform coefficients;
    f) for each watermark data transform coefficient, allocating an unlabeled data transform coefficient to be replaced and replacing the respective unlabeled data transform coefficients to produce a labeled set of data transform coefficients;
    g) storing the locations into which watermark data transform coefficients were encoded in the set of labeled data transform coefficients to generate a unique key for future decoding of the watermark data;
    h) performing an inverse orthogonal transformation on the labeled data transform coefficients to convert them into a set of labeled digital data having a form resembling the original unlabeled digital data.

2. The method of claim 1 wherein the step of formatting the watermark data includes the step of mapping the set of watermark data into a two-dimensional matrix.

3. The method of claim 2 wherein the step of formatting the watermark data includes the step of dividing the two-dimensional matrix of watermark data into smaller sub-blocks and the step of performing the orthogonal transformation on the watermark data involves performing the orthogonal transform on each sub-block of the watermark data, such that the watermark data transform coefficients are organized in sub-blocks.

4. The method as claimed in claim 3, including an ordering step in which each sub-block of the watermark data transform coefficients are reordered into a one-dimensional array in approximately increasing frequency order, as hereinbefore defined, prior to replacement of the allotted unlabeled data transform coefficients with the watermark data transform coefficients.

5. The method of claim 4, in which the step of reordering the watermark data transform coefficients of each sub-block is achieved by performing a zig-zag scan of the watermark data transform coefficients in the respective sub-block.

6. The method as claimed in claim 5, wherein after the watermark data transform coefficients of each sub-block are reordered into a one-dimensional array and before the replacement of unlabeled data transform coefficients with the watermark data the watermark data transform coefficients of each one-dimensional array are rescaled.

7. The method as claimed in claim 6, wherein the rescaling is performed using a scaling function that reduces the magnitude of lower frequency coefficients of the one-dimensional array by a greater amount than higher frequency coefficients of the respective array.

8. The method of claim 7, wherein the scaling function has an exponential characteristic.

9. The method of claim 4, in which the step of reordering the watermark data transform coefficients of each sub-block is achieved by performing a radial scan of the watermark data transform coefficients in the respective sub-block.

10. The method of claim 4 including the step of dividing the reordered watermark data transform coefficients of each sub-block into segments for subsequent replacement into the set of transformation coefficients of the unlabeled data.

11. The method as claimed in claim 4, wherein the step of formatting the unlabeled data includes the step of mapping the set of unlabeled data into a two-dimensional matrix.

12. The method of claim 11 wherein the step of formatting the unlabeled data includes the step of dividing the two-dimensional matrix of unlabeled data into smaller sub-blocks and the step of performing the orthogonal transformation on the unlabeled data involves performing the orthogonal transform on each sub-block of the unlabeled data, such that the unlabeled data transform coefficients are organized in sub-blocks.

13. The method of claim 12, including a first ordering step in which each sub-block of the unlabeled data transform coefficients are reordered into a one-dimensional array in approximately increasing frequency order, as hereinbefore defined, prior to replacement of allocated unlabeled data transform coefficients with watermark data transform coefficients, and a second ordering step in which each of the one-dimensional arrays of the labeled data transform coefficients are reordered into sub-blocks using an inverse reordering to that of the first ordering step.

14. The method of claim 13, wherein the first ordering step is achieved by performing a zig-zag scan of each sub-block of the unlabeled data transform coefficients and the second ordering step is achieved by performing an inverse zig-zag scan of each one-dimensional array of the labeled data transform coefficients.

15. The method of claim 14, including the step of, for each one-dimensional array of unlabeled data, determining a location beyond which the ac energies will fall below a certain threshold value and selecting transform coefficients beyond that location for replacement by transform coefficients of the watermark data.

16. The method of claim 15, including the step of calculating the mean and variance values of the ac energies from the orthogonal transformation coefficients for each one-dimensional array of unlabeled data and calculating the threshold value as a function of the mean and variance values.

17. The method of claim 13, wherein first ordering step is achieved by performing a radial scan of each sub-block of the unlabeled data transform coefficients and the second ordering step is achieved by performing an inverse radial scan of each one-dimensional array of the labeled data transform coefficients.

18. The method as claimed in claim 13, including the step of, for each one-dimensional array of the unlabeled data, allocating a segment of the orthogonally-transformed watermark data that will be encoded in that sub-block, if any.

19. The method as claimed in claim 1, wherein the orthogonal transform performed on the unlabeled data is selected from the group consisting of a Discrete Cosine Transform (DCT); a Fourier transform; a Walsh-Hadamard transform; a Haar transform; a sine transform; and a Wavelet transform, and the inverse transform is respectively; an inverse DCT; an inverse Fourier transform; an inverse Walsh-Hadamard transform; an inverse Haar transform; an inverse sine transform; and an inverse Wavelet transform.

20. The method as claimed in claim 19, wherein the orthogonal transform performed on the unlabeled data is a Discrete Cosine Transform (DCT) and the inverse transform is an inverse DCT.

21. The method as claimed in claim 1, wherein the orthogonal transform performed on the watermark data is selected from the group consisting of a Discrete Cosine Transform (DCT); a Fourier transform; a Walsh-Hadamard transform; a Haar transform; a sine transform; and a Wavelet transform.

22. The method as claimed in claim 21, wherein the orthogonal transform performed on the watermark data is a Discrete Cosine Transform (DCT).

23. The method as claimed in claim 1, including the further step of allocating in a structured manner a segment of the orthogonally-transformed unlabeled data that will be replaced by each segment of orthogonally transformed watermark data.

24. The method as claimed in claim 1, including the further step of allocating in a random manner a segment of the orthogonally-transformed unlabeled data that will be replaced by each segment of orthogonally transformed watermark data.

25. The method as claimed in claim 1, wherein the set of unlabeled digital data is obtained from a sample stream representing a digitized grayscale or color image.

26. The method as claimed in claim 25, wherein the digitized grayscale or color image is obtained from a digital still camera or a digital image scanner.

27. The method as claimed in claim 1, wherein the set of unlabeled digital data is obtained from a sample stream representing digitized video.

28. The method of claim 27, wherein the unlabeled digitized video is obtained from a Data Storage Medium (DSM), or a real time digital data source.

29. The method as claimed in claim 1, wherein the labeled digitized video is subsequently transmitted over a digital communications channel.

30. The method as claimed in claim 1, wherein the labeled digitized video is subsequently recorded on a digital recording medium.

31. The method as claimed in claim 30, wherein the digital recording medium is selected from the group consisting of a Video Compact Disc (VCD); a Laser Disc (LD); a Digital Versatile Disc (DVD); a digitized movie and a still image contained within a video game, video-on-demand or other software.

32. The method as claimed in claim 1, wherein the unlabeled digital data is obtained from a sample stream representing one or more channels of digitized sound or music.

33. The method of claim 32, wherein the unlabeled digitized sound or music is obtained from either a master recording on digital audio tape played on a digital tape recorder or a master recording on an analog audio tape played on an analog tape recorder and digitized via a digitizing interface.

34. The method as claimed in claim 32, wherein the labeled digitized sound or music is subsequently recorded on a digital recording medium.

35. The method as claimed in claim 34, wherein the digital recording medium is selected from the group consisting of a compact Disc (CD); a Digital Audio Tape (DAT); a Laser Disc (LD); a Video Compact Disc (VCD).

36. The method as claimed in claim 1, wherein the watermark digital data includes one or more of the following data items: an owner's logo; an owner's trademark; a personal identification; an artist's recorded voice; or general terms for publisher distribution.

37. A method for extracting digital watermarking image data or digital watermarking audio data from a digital image, audio, or video data sample, said method including the steps of:

a) inputting a set of labeled digital data and unique key data containing information of locations of watermark data imposed as a label on the labeled digital data;

b) mapping the set of labeled digital data into a format suitable for orthogonal transformation;
c) performing an orthogonal transformation on the formatted labeled data to produce a set of labeled data transform coefficients;
d) using the unique key to extract transform coefficients of orthogonally transformed watermark data from the locations in the set of labeled data transform coefficients specified in the key;
e) using an inverse orthogonal transformation on the transformed watermark data to retrieve the embedded watermark data;

wherein the step of formatting the labeled data includes the step of mapping the set of labeled data into a two-dimensional matrix and includes the step of dividing the two-dimensional matrix of labeled data into smaller sub-blocks and the step of performing the orthogonal transformation on the labeled data involves performing the orthogonal transform on each sub-block of the labeled data, such that the labeled data transform coefficients are organized in sub-blocks, including the step of ordering the orthogonal transformation coefficients of the labeled data in each sub-block into a one-dimensional array in approximately increasing frequency order, as hereinbefore defined, prior to extraction of the watermark data coefficients.

38. The method as claimed in claim 37, wherein the ordering step is achieved by performing a zig-zag scan of each sub-block of orthogonally transformed labeled data.

39. The method as claimed in claim 37, wherein the ordering step is achieved by performing a radial scan of each sub-block of orthogonally transformed labeled data.

40. A method for extracting digital watermarking image data or digital watermarking audio data from a digital image, audio, or video data sample, said method including the steps of:
a) inputting a set of labeled digital data and unique key data containing information of locations of watermark data imposed as a label on the labeled digital data,
b) mapping the set of labeled digital data into a format suitable for orthogonal transformation;
c) performing an orthogonal transformation on the formatted labeled data to produce a set of labeled data transform coefficients;
d) using the unique key to extract transform coefficients of orthogonally transformed watermark data from the locations in the set of labeled data transform coefficients specified in the key;
e) using an inverse orthogonal transformation on the transformed watermark data to retrieve the embedded watermark data;

wherein after extraction of the watermark transform coefficients from the orthogonally transformed labeled data, the extracted watermark data transform coefficients are arranged into a number of one-dimensional arrays corresponding to the number of sub-blocks used in the process of encoding the watermark data into the labeled data and each one-dimensional array is then reordered into a two-dimensional sub-block prior to performing the inverse orthogonal transform on the watermark data transform coefficients in each sub-block.

41. The method of claim 40, wherein the reordering of each one-dimensional array of watermark data transform coefficients into a respective sub-block is achieved by performing an inverse zig-zag scan.

42. The method of claim 40, wherein the reordering of each one-dimensional array of watermark data transform coefficients into a respective sub-block is achieved by performing an inverse radial scan.

43. A method for extracting digital watermarking image data or digital watermarking audio data from a digital image, audio, or video data sample, said method including the steps of:
a) inputting a set of labeled digital data and unique key data containing information of locations of watermark data imposed as a label on the labeled digital data;
b) mapping the set of labeled digital data into a format suitable for orthogonal transformation;
c) performing an orthogonal transformation on the formatted labeled data to produce a set of labeled data transform coefficients;
d) using the unique key to extract transform coefficients of orthogonally transformed watermark data from the locations in the set of labeled data transform coefficients specified in the key;
e) using an inverse orthogonal transformation on the transformed watermark data to retrieve the embedded watermark data;

wherein the transform coefficients of the watermark data embedded in the labeled digital data are compressed using a first scaling function and the method includes the step of expanding the compressed watermark data prior to the inverse orthogonal transformation using a second scaling function which is an inverse of the first scaling function.

44. The method of claim 43, wherein the inverse scaling function increases the magnitude of lower frequency coefficients of each one-dimensional array of watermark data to a greater extent than it increases the magnitude of the higher frequency coefficients of the respective one dimensional array.

45. The method of claim 43, wherein the first scaling function has an exponential characteristic and the second scaling function has an inverse exponential characteristic.

46. A method for extracting digital watermarking image data or digital watermarking audio data from a digital image, audio, or video data sample as an aid to authenticating the source or authorization of unlabeled digital data for use or output, said method including the steps of:
a) inputting a set of labeled digital data and unique key data containing information of locations of watermark data imposed as a label on the labeled digital data;
b) mapping the set of labeled digital data into a format suitable for orthogonal transformation;
c) performing an orthogonal transformation on the formatted labeled data to produce a set of labeled data transform coefficients;
d) using the unique key to extract transform coefficients of orthogonally transformed watermark data from the locations in the set of labeled data transform coefficients specified in the
e) using an inverse orthogonal transformation on the transformed watermark data to retrieve the embedded watermark data;
f) formatting the embedded watermark data into a format suitable for orthogonal transformation;
g) performing an orthogonal transformation on the formatted watermark data to reproduce the set of watermark data transform coefficients for use in generating the set of unlabeled digital data;

wherein the orthogonal transform performed on the labeled data is selected from the group consisting of a Discrete Cosine Transform (DCT); a Fourier transform; a Walsh-Hadamard transform; a Haar transform; a sine transform; and a Wavelet transform.

47. The method as claimed in claim 46, wherein the orthogonal transform performed on the labeled data is a DCT.

48. A method for extracting digital watermarking image data or digital watermarking audio data from a digital image, audio, or video data sample as an aid to authenticating the source or authorization of unlabeled digital data for use or output, said method including the steps of:
  a) inputting a set of labeled digital data and unique key data containing information of locations of watermark data imposed as a label on the labeled digital data;
  b) mapping the set of labeled digital data into a format suitable for orthogonal transformation;
  c) performing an orthogonal transformation on the formatted labeled data to produce a set of labeled data transform coefficients;
  d) using the unique key to extract transform coefficients of orthogonally transformed watermark data from the locations in the set of labeled data transform coefficients specified in the key;
  e) using an inverse orthogonal transformation on the transformed watermark data to retrieve the embedded watermark data
  f) formatting the embedded watermark data into a format suitable for orthogonal transformation;
  g) performing an orthogonal transformation on the formatted watermark data to reproduce the set of watermark data transform coefficients for use in generating the set of unlabeled digital data;
wherein the inverse orthogonal transform performed on the watermark data is selected from the group consisting of an inverse Discrete Cosine Transform (DCT); an inverse Fourier transform; an inverse Walsh-Hadamard transform; an inverse Haar transform; an inverse sine transform; and an inverse Wavelet transform.

49. The method as claimed in claim 48, wherein the inverse orthogonal transform performed on the watermark data is an inverse DCT.

50. A method for extracting digital watermarking image data or digital watermarking audio data from a digital image, audio or video data sample as an aid to authenticating the source or authorization of unlabeled digital data for use or output, said method including the steps of:
  a) inputting a set of labeled digital data and unique key data containing information of locations of watermark data imposed as a label on the labeled digital data;
  b) mapping the set of labeled digital data into a format suitable for orthogonal transformation;
  c) performing an orthogonal transformation on the formatted labeled data to produce a set of labeled data transform coefficients;
  d) using the unique key to extract transform coefficients of orthogonally transformed watermark data from the locations in the set of labeled data transform coefficients specified in the key;
  e) using an inverse orthogonal transformation on the transformed watermark data to retrieve the embedded watermark data
  f) formatting the embedded watermark data into a format suitable for orthogonal transformation;
  g) performing an orthogonal transformation on the formatted watermark data to reproduce the set of watermark data transform coefficients for use in generating the set of unlabeled digital data;
wherein the labeled digital data is obtained from a sample stream representing digitized video and the labeled digitized video is obtained from selected from the group consisting of a Video Compact Disc (VCD) played on a VCD player; a Laser Disc (LD) played on a LD player; a Digital Versatile Disc (DVD) played on a DVD player; a digitized movie or still image contained within a video game or other software or a digital signal transmitted over a communications channel.

51. A method for extracting digital watermarking image data or digital watermarking audio data from a digital image, audio, or video data sample as an aid to authenticating the source or authorization of unlabeled digital data for use or output, said method including the steps of:
  a) inputting a set of labeled digital data and unique key data containing information of locations of watermark data imposed as a label on the labeled digital data:
  b) mapping the set of labeled digital data into a format suitable for orthogonal transformation:
  c) performing an orthogonal transformation on the formatted labeled data to produce a set of labeled data transform coefficients:
  d) using the unique key to extract transform coefficients of orthogonally transformed watermark data from the locations in the set of labeled data transform coefficients specified in the
  e) using an inverse orthogonal transformation on the transformed watermark data to retrieve the embedded watermark data
  f) formatting the embedded watermark data into a format suitable for orthogonal transformation;
  g) performing an orthogonal transformation on the formatted watermark data to reproduce the set of watermark data transform coefficients for use in generating the set of unlabeled digital data;
wherein the labeled digital data is obtained from a sample stream representing one or more channels of digitized sound or music and the labeled digitized sound or music is obtained from the group consisting of a Compact Disc (CD) played on a CD player; a Digital Audio Tape (DAT) played on a DAT player; a Laser Disc (LD) played on a LD player; from a Video Compact Disc (VCD) played on a VCD player.

52. A method for extracting digital watermarking image data or digital watermarking audio data from a digital image, audio, or video data sample as an aid to authenticating the source or authorization of unlabeled digital data for use or output, said method including the steps of:
  a) inputting a set of labeled digital data and unique key data containing information of locations of watermark data imposed as a label on the labeled digital data:
  b) mapping the set of labeled digital data into a format suitable for orthogonal transformation;
  c) performing an orthogonal transformation on the formatted labeled data to produce a set of labeled data transform coefficients;
  d) using the unique key to extract transform coefficients of orthogonally transformed watermark data from the locations in the set of labeled data transform coefficients specified in the
  e) using an inverse orthogonal transformation on the transformed watermark data to retrieve the embedded watermark data
  f) formatting the embedded watermark data into a format suitable for orthogonal transformation;
  g) performing an orthogonal transformation on the formatted watermark data to reproduce the set of watermark data transform coefficients for use in generating the set of unlabeled digital data;
wherein the watermark digital data includes one or more data items selected from the group consisting of an owner's logo; an owner's trademark; a personal identification; an artist's recorded voice; and general terms for publisher distribution.

* * * * *